US012374304B2

(12) United States Patent
Li et al.

(10) Patent No.: US 12,374,304 B2
(45) Date of Patent: Jul. 29, 2025

(54) DISPLAY APPARATUS, AND IMAGE PROCESSING METHOD FOR COMPENSATING IMAGE

(71) Applicant: HISENSE VISUAL TECHNOLOGY CO., LTD., Shandong (CN)

(72) Inventors: Xiaolong Li, Shandong (CN); Chong Chen, Shandong (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 0 days.

(21) Appl. No.: 18/732,156

(22) Filed: Jun. 3, 2024

(65) Prior Publication Data

US 2024/0321224 A1 Sep. 26, 2024

Related U.S. Application Data

(63) Continuation of application No. PCT/CN2022/121413, filed on Sep. 26, 2022.

(30) Foreign Application Priority Data

Dec. 24, 2021 (CN) ........................ 202111605368.7

(51) Int. Cl.
*G09G 3/34* (2006.01)
*G09G 3/36* (2006.01)

(52) U.S. Cl.
CPC ........... *G09G 3/342* (2013.01); *G09G 3/3607* (2013.01); *G09G 2320/0646* (2013.01); *G09G 2360/16* (2013.01)

(58) Field of Classification Search
CPC ................ G09G 3/342; G09G 3/3607; G09G 2320/0646; G09G 2360/01
See application file for complete search history.

(56) References Cited

U.S. PATENT DOCUMENTS

2011/0128302 A1 6/2011 Cho et al.
2016/0247460 A1* 8/2016 Kim .................... G09G 3/3413
(Continued)

FOREIGN PATENT DOCUMENTS

CN 102081258 A 6/2011
CN 105139809 A 12/2015
(Continued)

*Primary Examiner* — Kwang-Su Yang
(74) *Attorney, Agent, or Firm* — Meunier Carlin & Curfman LLC

(57) ABSTRACT

A display apparatus, and an image processing method. The display apparatus can include at least one processor and a display. The at least one processor is configured to execute instructions to cause the display apparatus to: obtain backlight values of all the partitions according to a video signal, and obtain, according to the backlight values of all the partitions, an image signal of an image to be displayed; send the backlight values of all the partitions to a partition backlight processing module, so that the partition backlight processing module obtains a backlight gain parameter according to the backlight values of all the partitions; and receive the backlight gain parameter returned by the partition backlight processing module, determine a compensation parameter according to the backlight gain parameter, and obtain a compensated image signal according to the compensation parameter and the image signal.

16 Claims, 12 Drawing Sheets

(56) References Cited

U.S. PATENT DOCUMENTS

| | | | | |
|---|---|---|---|---|
| 2016/0309112 | A1* | 10/2016 | Tsai | H04N 5/57 |
| 2017/0061897 | A1 | 3/2017 | Zhang et al. | |
| 2017/0061902 | A1* | 3/2017 | Zhang | G09G 3/3426 |
| 2018/0090082 | A1* | 3/2018 | Zhang | G09G 3/3607 |
| 2021/0225298 | A1 | 7/2021 | Shi et al. | |
| 2022/0238079 | A1* | 7/2022 | Yu | G09G 3/3426 |

FOREIGN PATENT DOCUMENTS

| | | | | | |
|---|---|---|---|---|---|
| CN | 105575342 | A | | 5/2016 | |
| CN | 109887468 | A | | 6/2019 | |
| CN | 112308044 | A | * | 2/2021 | G06K 9/00885 |
| WO | 2020172822 | A1 | | 9/2020 | |

* cited by examiner

| | | | | | | | |
|---|---|---|---|---|---|---|---|
| 0 | 0 | 0 | 0 | 0 | 0 | 0 | 0 |
| 0 | 0 | 128 | 128 | 128 | 0 | 0 | 0 |
| 0 | 0 | 128 | 128 | 128 | 0 | 0 | 0 |
| 0 | 0 | 128 | 128 | 128 | 0 | 0 | 0 |
| 0 | 0 | 0 | 0 | 0 | 0 | 0 | 0 |
| 0 | 0 | 0 | 0 | 0 | 0 | 0 | 0 |

Fig. 8

DISPLAY APPARATUS, AND IMAGE PROCESSING METHOD FOR COMPENSATING IMAGE

CROSS-REFERENCE TO RELATED APPLICATIONS

The application is a continuation of International Application No. PCT/CN2022/121413, filed on Sep. 26, 2022, which claims priority to Chinese Patent Application No. 202111605368.7, filed to the China Patent Office on Dec. 24, 2021, the entire content of which is incorporated herein by reference.

TECHNICAL FIELD

Embodiments of the disclosure relate to the technical field of display, in particular to a display apparatus, and an image processing method.

BACKGROUND

With the continuous improvement of liquid crystal display (LCD) products, an LCD not only achieves 4K-level picture display and wider color field display, but also has the advantages of image color reproducibility, high chromaticity, high image brightness, etc.

In the related art, a partition backlight processing module of the LCD enhances the brightness and color contrast of an image displayed on the LCD by adopting an area light control technology and a method of improving a peak brightness of a local partition, which improves a display effect of the image.

However, improving the backlight brightness of the LCD may cause colors of the image to fade, affecting the display effect of the image.

SUMMARY

The disclosure provides a display apparatus, and an image processing method, a problem that colors of an image fade in the related art is solved, the color brightness of the image to be displayed is optimized, and the display effect of the image is improved.

Some embodiments of the disclosure provide a display apparatus, including: at least one processor; and a display in connection with the at least one processor. The at least one processor is configured to execute instructions to cause the display apparatus to: obtain backlight values of all partitions according to a video signal, and obtain an image signal of an image to be displayed according to the backlight values of all the partitions; send the backlight values of all the partitions to a partition backlight processing module, so that the partition backlight processing module obtains a backlight gain parameter according to the backlight values of all the partitions, where the partition backlight processing module is configured to drive backlight display of a backlight module; and receive the backlight gain parameter returned by the partition backlight processing module, determine a compensation parameter according to the backlight gain parameter, and obtain a compensated image signal according to the compensation parameter and the image signal. The display is configured to display the compensated image.

In some embodiments, the at least one processor is further configured to execute instructions to cause the display apparatus to: determine the compensation parameter corresponding to the backlight gain parameter according to a preset mapping table.

In some embodiments, the at least one processor is further configured to execute instructions to cause the display apparatus to: determine the compensation parameter corresponding to the backlight gain parameter according to a peak brightness compensation curve.

In some embodiments, the at least one processor is further configured to execute instructions to cause the display apparatus to: determine a maximum value of the backlight gain parameter as a backlight gain parameter threshold, and determine a compensation parameter threshold for the backlight gain parameter threshold according to a target chromaticity value, where the target chromaticity value is a standard chromaticity value of the display apparatus; and determine a target parameter according to the backlight gain parameter threshold and the compensation parameter threshold, and generate the peak brightness compensation curve according to the target parameter, where the peak brightness compensation curve is a logarithmic function curve, and the target parameter is a base of the peak brightness compensation curve.

In some embodiments, the at least one processor is further configured to execute instructions to cause the display apparatus to: generate a timing control signal according to the compensated image signal, so that a timing controller drives image display of a liquid crystal panel according to the timing control signal; and determine an adjustment parameter according to the image displayed in the liquid crystal panel, and adjust the peak brightness compensation curve according to the adjustment parameter.

In some embodiments, the at least one processor is further configured to execute instructions to cause the display apparatus to: perform image quality enhancement processing on the video signal to obtain position information of all to-be-enhanced partitions corresponding to preset to-be-enhanced image information.

In some embodiments, the at least one processor is further configured to execute instructions to cause the display apparatus to: after determining the compensation parameter according to the backlight gain parameter, determine an image signal of a to-be-enhanced area according to the position information corresponding to all the to-be-enhanced partitions; and obtain the compensated image signal corresponding to the to-be-enhanced area according to the compensation parameter and the image signal of the to-be-enhanced area.

In some embodiments, the at least one processor is further configured to execute instructions to cause the display apparatus to: determine the number of all the to-be-enhanced partitions according to the position information corresponding to all the to-be-enhanced partitions, and determine a proportion coefficient according to the number of all the to-be-enhanced partitions and the number of all partitions.

In some embodiments, the at least one processor is further configured to execute instructions to cause the display apparatus to: based on that the proportion coefficient is greater than or equal to a preset percentage, obtain the compensated image signal corresponding to the to-be-enhanced area according to the compensation parameter and the image signal of the to-be-enhanced area; and based on that the proportion coefficient is less than the preset percentage, obtain the compensated image signal according to the compensation parameter and the image signal.

In some embodiments, the compensation parameter is a chromaticity compensation parameter.

Some embodiments of the disclosure provide an image processing method for a display apparatus, including: obtaining backlight values of all partitions according to a video signal, and obtaining an image signal of an image to be displayed according to the backlight values of all the partitions; sending the backlight values of all the partitions to a partition backlight processing module, so that the partition backlight processing module obtains a backlight gain parameter according to the backlight values of all the partitions, where the partition backlight processing module is configured to drive backlight display of a backlight module; and receiving the backlight gain parameter returned by the partition backlight processing module, determining a compensation parameter according to the backlight gain parameter, and obtaining a compensated image signal according to the compensation parameter and the image signal.

In some embodiments, the method further includes: determining the compensation parameter corresponding to the backlight gain parameter according to a preset mapping table.

In some embodiments, the method further includes: determining the compensation parameter corresponding to the backlight gain parameter according to a peak brightness compensation curve.

In some embodiments, before determining the compensation parameter corresponding to the backlight gain parameter according to the peak brightness compensation curve, the method further includes: determining a maximum value of the backlight gain parameter as a backlight gain parameter threshold, and determining a compensation parameter threshold for the backlight gain parameter threshold according to a target chromaticity value, where the target chromaticity value is a standard chromaticity value of the display apparatus; and determining a target parameter according to the backlight gain parameter threshold and the compensation parameter threshold, and generating the peak brightness compensation curve according to the target parameter, where the peak brightness compensation curve is a logarithmic function curve, and the target parameter is a base of the peak brightness compensation curve.

In some embodiments, after obtaining the compensated image signal according to the compensation parameter and the image signal, the method further includes: generating a timing control signal according to the compensated image signal, so that a timing controller drives image display of a liquid crystal panel according to the timing control signal; and determining an adjustment parameter according to the image displayed in the liquid crystal panel, and adjusting the peak brightness compensation curve according to the adjustment parameter.

In some embodiments, before obtaining the backlight values of all the partitions according to the video signal, the method further includes: performing image quality enhancement processing on the video signal to obtain position information of all to-be-enhanced partitions corresponding to preset to-be-enhanced image information.

In some embodiments, after determining the compensation parameter according to the backlight gain parameter, the method further includes: determining an image signal of a to-be-enhanced area according to the position information corresponding to all the to-be-enhanced partitions; and obtaining the compensated image signal corresponding to the to-be-enhanced area according to the compensation parameter and the image signal of the to-be-enhanced area.

In some embodiments, before determining the image signal of all the to-be-enhanced partitions according to the compensation parameter and the position information of all the to-be-enhanced partitions, the method further includes: determining a quantity of all the to-be-enhanced partitions according to the position information corresponding to all the to-be-enhanced partitions, and determining a proportion coefficient according to the quantity of all the to-be-enhanced partitions and a quantity of all partitions.

In some embodiments, the method further includes: based on that the proportion coefficient is greater than or equal to a preset percentage, obtaining the compensated image signal corresponding to the to-be-enhanced area according to the compensation parameter and the image signal of the to-be-enhanced area; and based on that the proportion coefficient is less than the preset percentage, obtaining the compensated image signal according to the compensation parameter and the image signal.

In some embodiments, the compensation parameter is a chromaticity compensation parameter.

BRIEF DESCRIPTION OF FIGURES

FIG. 8 is a schematic diagram of partition backlight values of a backlight module according to some embodiments of the disclosure.

DETAILED DESCRIPTION

In order to make objectives, embodiments and advantages of the disclosure clearer, embodiments of the disclosure will be clearly and completely described below in combination with drawings in embodiments of the disclosure. Apparently, the described embodiments are only some of the embodiments of the disclosure, not all of them.

Based on the embodiments described in the disclosure, all other embodiments obtained by those ordinarily skilled in the art without making creative work fall within the scope of protection of the appended claims of the disclosure. In addition, although contents disclosed in the disclosure are discussed according to one or more examples, it should be understood that various aspects of these disclosed contents may also constitute a complete embodiment individually.

Figure 1:
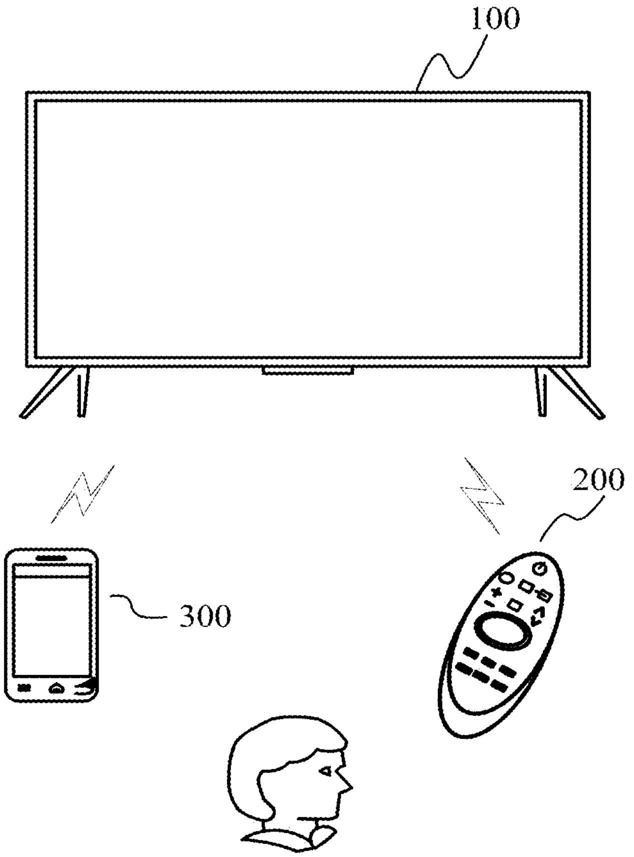
FIG. 1 is a schematic diagram of an operation scenario between a display apparatus and a control device according to some embodiments of the disclosure.

FIG. 1 is a schematic diagram of an operation scenario between a display apparatus and a control device according to some embodiments of the disclosure. As shown in FIG. 1, a user may operate a display apparatus 200 through a mobile terminal 300 and a control device 100. The control device 100 may be a remote control, communication between a remote control and the display apparatus can include infrared protocol communication and Bluetooth protocol communication, and the display apparatus 200 can be controlled in wireless or other wired modes. The user may control the display apparatus 200 by inputting a user command through keys on the remote control, voice input, control panel input and the like. In some embodiments, the display apparatus 200 may also be controlled by using the mobile terminal, a tablet computer, a computer, a notebook computer and other intelligent devices.

Figure 2:
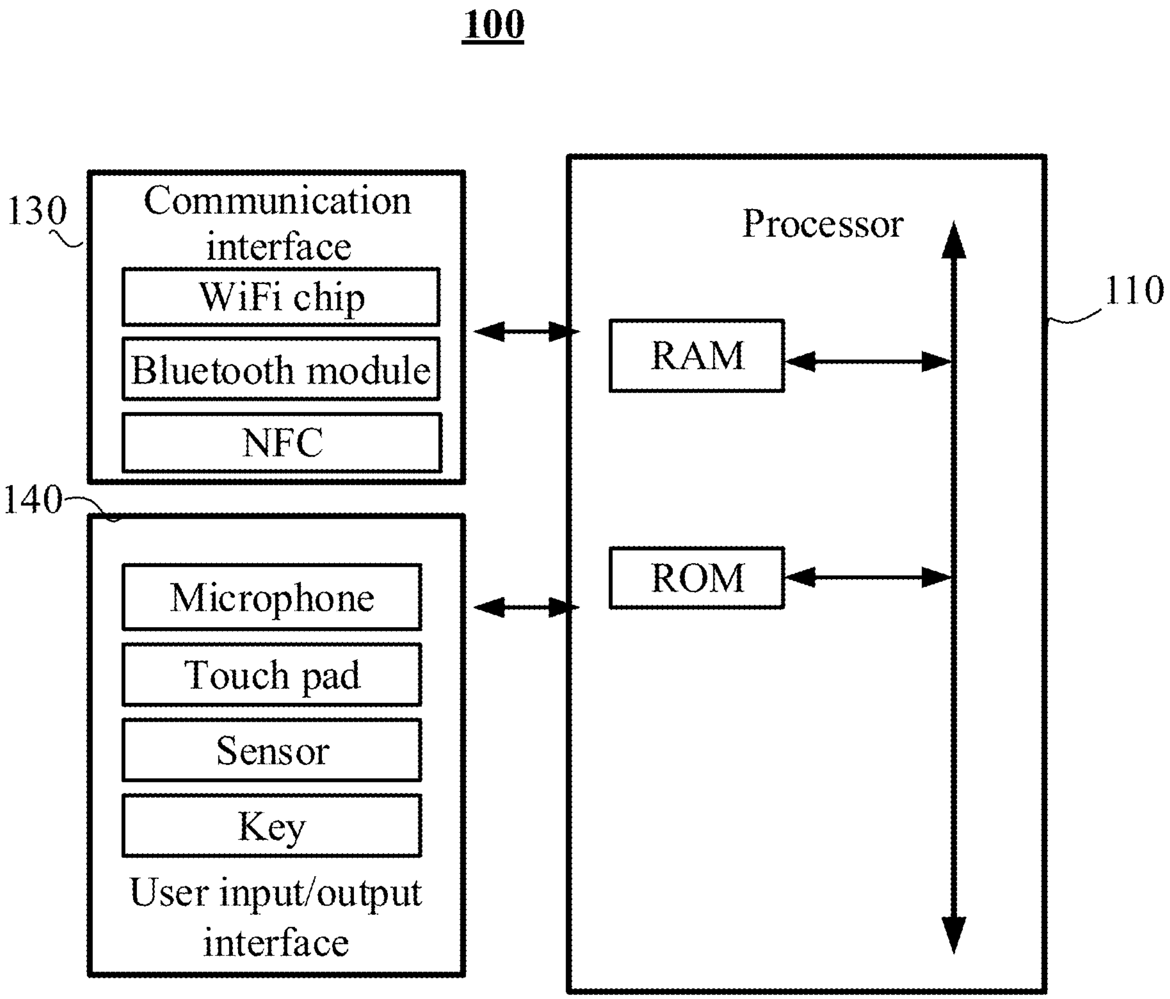
FIG. 2 is a block diagram of hardware configuration of a control device 100 according to some embodiments of the disclosure.

FIG. 2 is a block diagram of configuration of a control device 100 according to some embodiments of the disclosure. As shown in FIG. 2, the control device 100 can include a processor 110, a communication interface 130, a user input/output interface 140, a memory and a power supply. The control device 100 may receive an operation command from a user and convert the operation command into an instruction capable of being recognized and responded to by the display apparatus 200, and plays an interaction intermediary role between the user and the display apparatus 200.

In some embodiments, the communication interface 130 can be used for communicating with outside, and can include at least one of a WIFI chip, a Bluetooth module, near field communication (NFC), or a replaceable module.

In some embodiments, the user input/output interface 140 can include at least one of a microphone, a touchpad, a sensor, a key, or a replaceable module.

Figure 3:
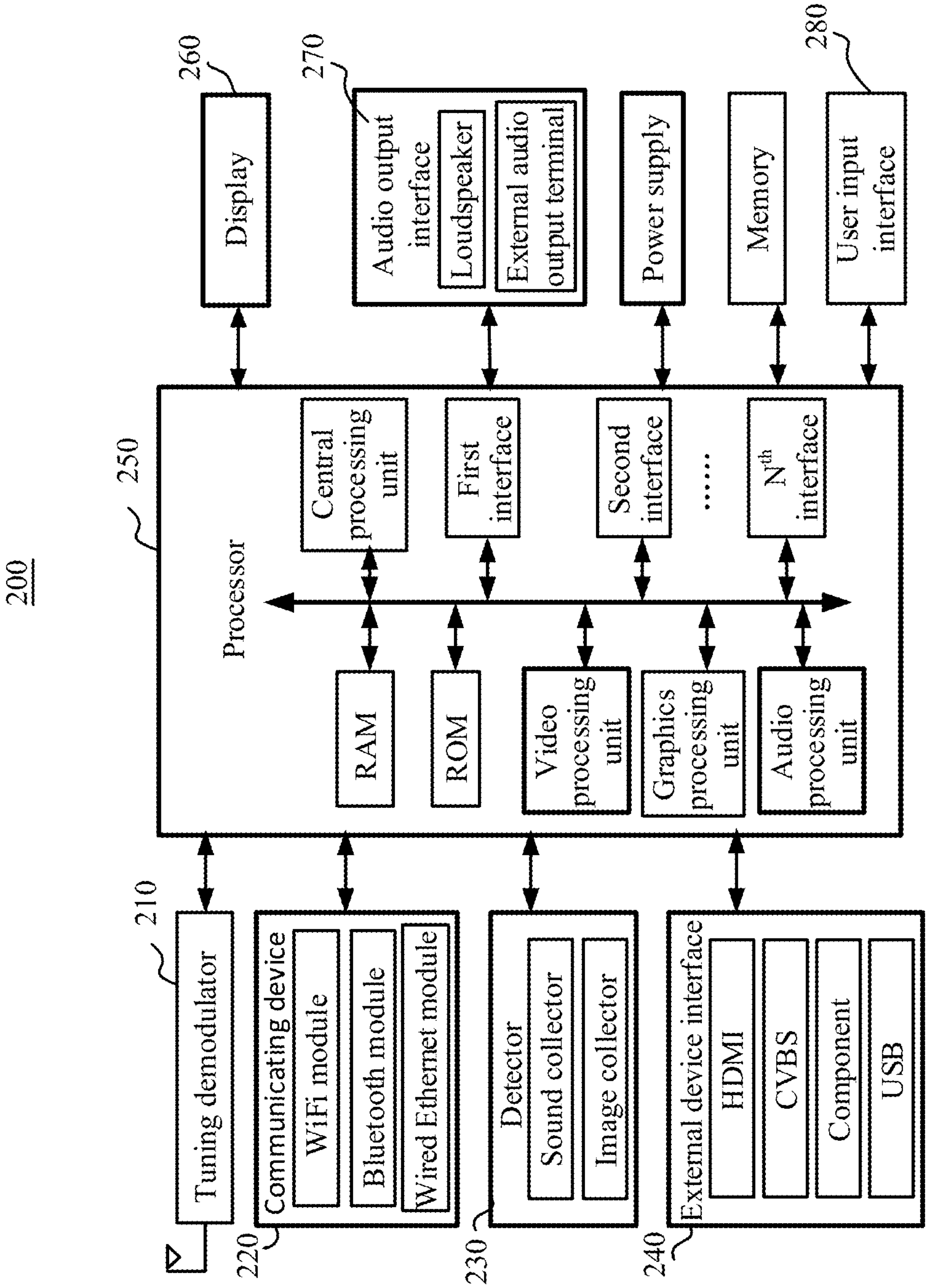
FIG. 3 is a block diagram of hardware configuration of a display apparatus 200 according to some embodiments of the disclosure.

FIG. 3 is a block diagram of hardware configuration of a display apparatus 200 according to some embodiments of the disclosure.

In some embodiments, the display apparatus 200 can include at least one of a tuning demodulator 210, a communicating device 220, a detector 230, an external device interface 240, a processor 250, a display 260, an audio output interface 270, a memory, a power supply, or a user interface.

In some embodiments, the processor can include at least one processor, for example, a central processing unit, a video processor, an audio processor, a graphics processing unit, a random access memory (RAM), a read-only memory (ROM), and a first interface to an $n^{th}$ interface for input/output.

In some embodiments, the display 260 can include a panel component for presenting a picture, a driving component for driving image display, a component for receiving an image signal output from the processor to display a video content, an image content, and a menu control interface, a user interface (UI) for user operation, and the like.

In some embodiments, the display 260 may be at least one of a liquid crystal display, an organic light-emitting diode (OLED) display, or a projection display, and may also be a projection apparatus and a projection screen.

In some embodiments, the tuning demodulator 210 can receive broadcasting television signals in a wired or wireless mode, and demodulate audio and video signals (e.g., electronic program guide (EPG) data signals) from a plurality of wireless or wired broadcasting television signals.

In some embodiments, the communicating device 220 is a component used for communicating with an external device or a server according to various communication protocols. For example: the communicating device may include at least one of a Wifi module, a Bluetooth module, a wired Ethernet module and other network communication protocol chips or near-field communication protocol chips, or an infrared receiver. The display apparatus 200 may send/receive a control signal and a data signal to/from the control device 100 or the server 400 through the communicating device 220.

In some embodiments, the detector 230 can be used for collecting a signal of an external environment or a signal interacting with the outside. For example, the detector 230 can include a light receiver, and a sensor for collecting the intensity of ambient light; or, the detector 230 can include an image collector, such as a camera, which may be used for collecting an external environmental scenario, an attribute of the user, or a gesture of a user interaction, or; the detector 230 can include a sound collector, such as a microphone, which is used for receiving a sound from outside.

In some embodiments, the external device interface 240 may include but is not limited to any one or more of the following: a high definition multimedia interface (HDMI), an analog or digital high definition component input interface (component), a composite video input interface (CVBS), a USB input interface (USB), an RGB port, and the like. The external device interface 240 may also be a composite input/output interface formed by the plurality of interfaces above.

In some embodiments, the processor(s) and the tuning demodulator 210 may be located in different split devices, that is, the tuning demodulator 210 may also be located in an external device of a main device where the processor(s) is located, such as an external set-top box.

In some embodiments, the processor(s) can control work of the display apparatus and responds to user's operations through various software programs stored on the memory. The processor(s) can control an overall operation of the display apparatus 200. For example: in response to receiving a user command for selecting a user interface (UI) object presented on the display 260, the processor(s) may execute an operation related to the object selected by the user command.

In some embodiments, the object may be any one of optional objects, such as a hyperlink, an icon, or other operable controls. The operation related to the selected object can include: operations of displaying connections to hyperlink pages, documents, images, etc., or an operation of launching an application corresponding to the icon.

In some embodiments, the processor(s) can include at least one of a central processing unit (CPU), a video processor, an audio processor, a graphics processing unit (GPU), a random access memory (RAM), a read-only memory (ROM), a first interface to an $n^{th}$ interface for input/output, a communication bus (Bus), or the like.

The CPU can be used for running an operating system and instructions stored in the memory and executing various applications, data and contents according to various received interaction instructions input externally, so as to finally display and play various audio and video contents. The CPU may include a plurality of processors. For example, the CPU can include a main processor and one or more sub-processors.

In some embodiments, the graphics processing unit can be used for generating various graphic objects, such as: at least one of an icon, an operating menu, display graphics for user operation, or the like. The graphics processing unit can include an arithmetic unit for performing operations by receiving various interaction instructions from the user, and displaying various objects according to display attributes; and the graphics processing unit can further include a renderer for rendering various objects obtained based on the arithmetic unit, and the above rendered objects are used for being displayed on the display.

In some embodiments, the video processor can be used for receiving an external video signal and performing at least one of video processing operations such as decompression, decoding, scaling, noise reduction, frame rate conversion, resolution conversion and image synthesis according to a standard encoding and decoding protocol of the input signal, to obtain a signal capable of being directly displayed or played on the display apparatus 200.

In some embodiments, the video processor can include at least one of a demultiplexing module, a video decoding module, an image synthesizing module, a frame rate converting module, a display formatting module, or the like. The demultiplexing module is used for demultiplexing an input audio and video data stream. The video decoding module is used for processing the demultiplexed video signal, including decoding and scaling processing. The image synthesizing module, such as an image synthesizer, is used for superimposing and mixing a GUI signal generated by a graphic generator according to the user's input or generated by the graphic generator with a video image obtained after scaling processing, to generate an image signal for display. The frame rate converting module can be used for converting the frame rate of the input video. The display formatting module can be used for outputting a signal for a video received after the frame rate conversion, and changing the signal to conform to a display format of the signal, such as outputting an RGB data signal.

In some embodiments, the audio processor can be used for receiving an external audio signal, and performing at least one of processing operations such as decompression and decoding, noise reduction, analog-digital conversion and amplification processing according to the standard encoding and decoding protocol of the input signal, to obtain a sound signal which can be played in a loudspeaker.

In some embodiments, the user may input a user command on a graphics user interface (GUI) shown on the display 260, and a user input interface can receive a command through the GUI. Alternatively, the user may input a command by inputting a specific sound or gesture, and the user input interface recognizes the sound or gesture through a sensor to receive the user input command.

In some embodiments, the "user interface" can be a medium interface for interaction and information exchange between an application or operating system and the user, which implements a conversion between an internal form of information and a form acceptable to the user. A common representation form of the user interface can be the GUI, which can be a user interface related to a computer operation and displayed in a graphic form. The user interface may be an icon, a window, a control and other interface elements shown in a display screen of an electronic device. The control may include at least one of an icon, a button, a menu, a tab, a text box, a dialog box, a status bar, a navigation bar, widget or other visual interface elements.

In some embodiments, the user input interface 280 can be an interface used for receiving control input (e.g., a physical key on the display apparatus, or other, etc.).

In some embodiments, the system of the display apparatus may include a kernel, a command parser (shell), a file system, and an application. The kernel, the shell, and the file system together make up a basic operating system structure, which allows the user to manage files, run programs, and use the system. Upon power-on, the kernel is launched, the kernel space is activated, hardware is abstracted, hardware parameters are initialized, etc.; and the virtual memory, a scheduler, a signal, and inter-process communication (IPC) are run and maintained. After the kernel is launched, the shell and the user application are loaded. After launched, the application is compiled into machine codes to form a process.

Figure 4:
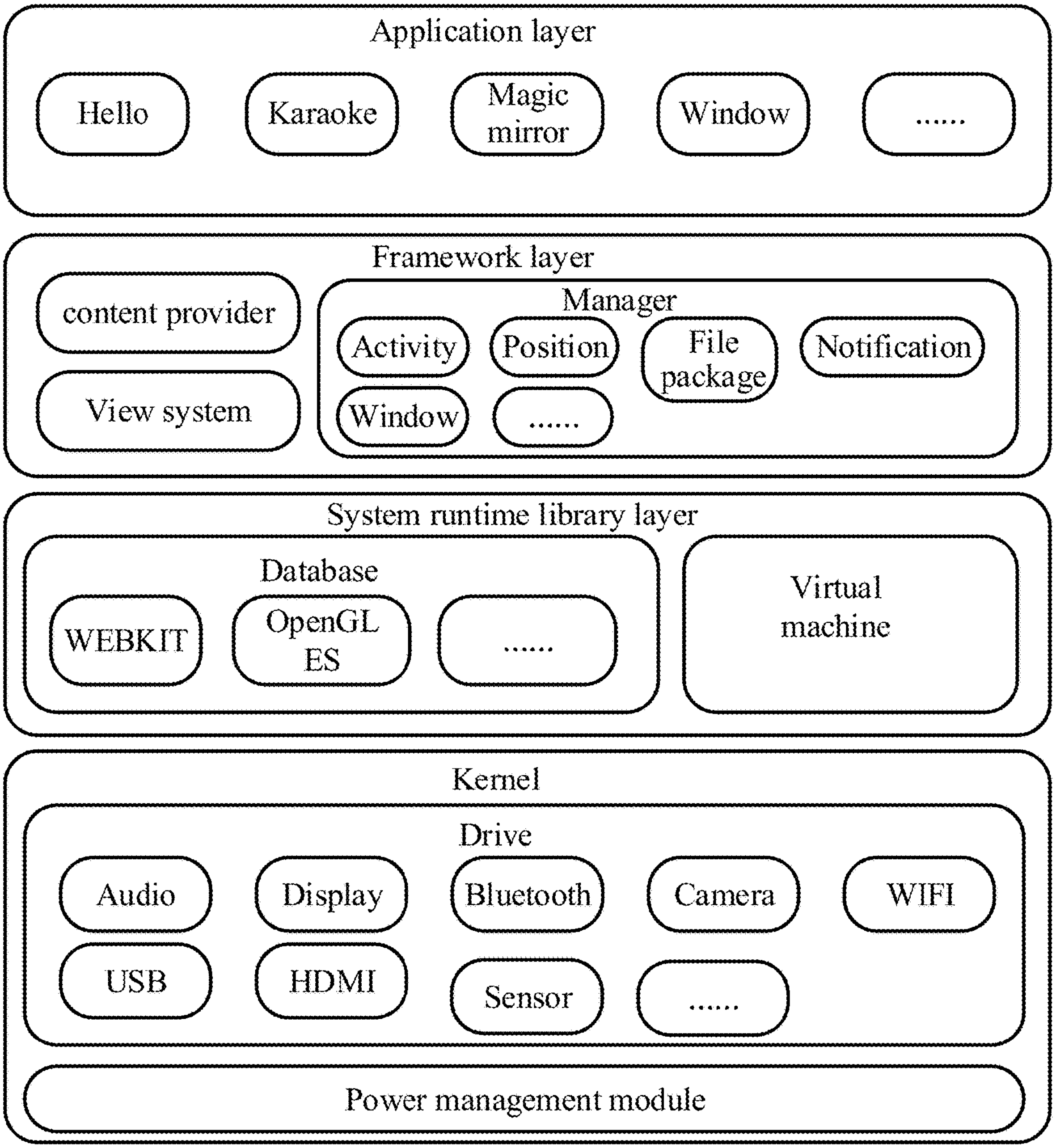
FIG. 4 is a schematic diagram of hardware configuration of a display apparatus according to some embodiments of the disclosure.

FIG. 4 is a schematic diagram of hardware configuration of a display apparatus according to some embodiments of the disclosure. As shown in FIG. 4, the system can be divided into four layers which are the applications layer, the application framework layer (referred to as the "framework layer"), the Android runtime and system library layer (referred to as the "system runtime library layer"), and the kernel layer respectively from top to bottom. The kernel layer can include at least one of the following drivers: an audio driver, a display driver, a Bluetooth driver, a camera driver, a wireless fidelity (WIFI) driver, a universal serial bus (USB) driver, an HDMI driver, a sensor driver (e.g., a fingerprint sensor, a temperature sensor, a pressure sensor, etc.), and a power driver.

Figure 5:
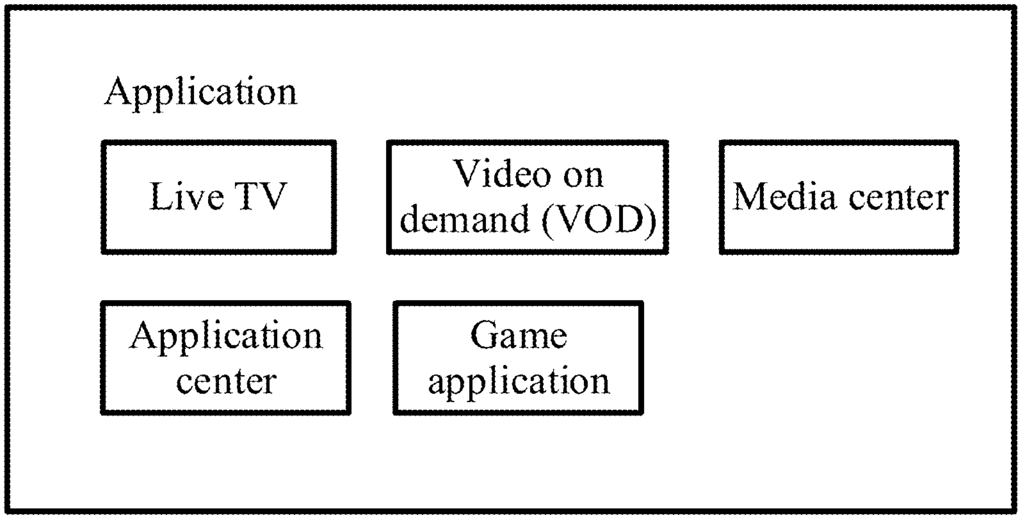
FIG. 5 is a schematic diagram of interface display of application icon(s) in a display apparatus according to some embodiments of the disclosure.

FIG. 5 is a schematic diagram of interface display of application icon(s) in a display apparatus according to some embodiments of the disclosure. As shown in FIG. 5, the application layer can include at least one application capable of displaying a corresponding icon in the display, such as: a live television application icon, a video on demand application icon, a media center application icon, an application center icon and a game application icon.

The partition backlight processing module of the liquid crystal display (LCD) enhances a brightness and color contrast of an image displayed on the LCD by adopting an area light control technology and a method of improving a peak brightness of a local partition, which improves a display effect of the image. The display image can be compensated in a system on chip (SOC) of the LCD, but it is only limited to a compensating effect of the area light control technology and cannot actually adapt to changes in the image after the peak brightness is increased, resulting in fading of the color of the image, and affecting the display effect of the image.

With respect to the problem that colors of an image displayed on an LCD fade in an existing method, the disclosure provides a display apparatus, and an image processing method. By using a backlight gain parameter returned by a partition backlight processing module to determine a compensation parameter, a compensated image signal is obtained according to the compensation parameter and a signal of an image to be displayed, chromaticity of the image is dynamically compensated, a color brightness of the image to be displayed is optimized, and a display effect of the image is improved.

Figure 6:
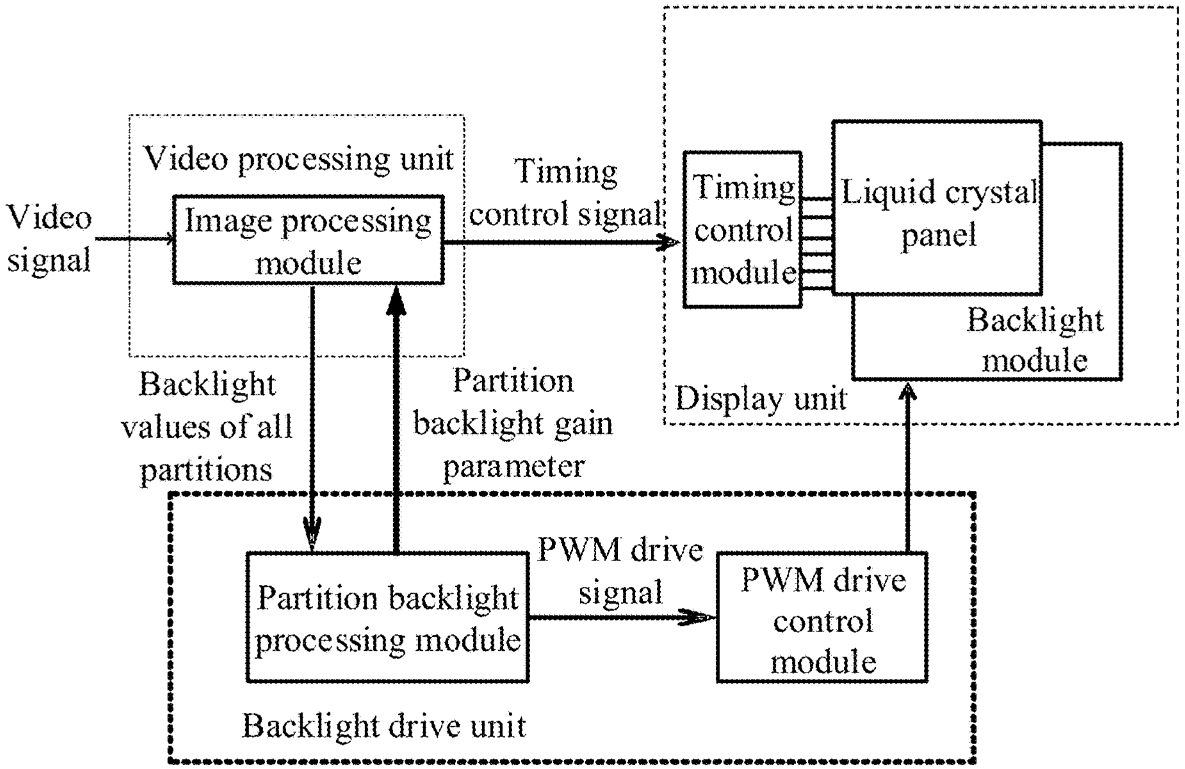
FIG. 6 is a schematic structural diagram of a display apparatus according to some embodiments of the disclosure.

FIG. 6 is a schematic structural diagram of a display apparatus according to some embodiments of the disclosure. As shown in FIG. 6, the display apparatus according to the embodiments of the disclosure can include a processor(s) and a display. Specifically, the processor(s) can include a video processing unit, a backlight drive unit and a display unit. Specifically, the video processing unit can include an image processing module, which is a functional unit in a system chip of the display apparatus and can be used for performing image processing on the video signal. The backlight drive unit can include a partition backlight processing module and a pulse-width modulation (PWM) drive control module, and specifically the backlight module is driven as a microprocessor for controlling display of the backlight module. The display unit can include a timing control module, a liquid crystal panel and the backlight module, which is used for displaying an image.

In some embodiments of the disclosure, on one hand, the image processing module in the video processing unit performs processing according to the received video signal to obtain the backlight values of all the partitions in the backlight module; on the other hand, the image processing module also determines the image signal of the image to be displayed according to the backlight values of all the partitions; and the image processing module further transmits the backlight values of all the partitions to the backlight drive unit.

In some embodiments of the disclosure, the partition backlight processing module in the backlight drive unit determines the backlight gain parameter according to the backlight values of all the partitions, and returns the backlight gain parameter to the image processing module, so that the image processing module adjusts and determines the image signal of the image to be displayed according to the backlight gain parameter, generates a timing control signal according to the adjusted image signal of the image to be displayed, and sends the timing control signal to the display unit, causing the timing control module in the display unit to control image display of the liquid crystal panel according to the timing control signal.

In some embodiments of the disclosure, the partition backlight processing module in the backlight drive unit further generates a PWM drive signal according to the backlight gain parameter and the backlight values of all the partitions, and transmits the PWM drive signal to the PWM drive control module, so that the PWM drive control module controls the display brightness of all light emitting diodes in the backlight module according to the PWM drive signal.

Figure 7:
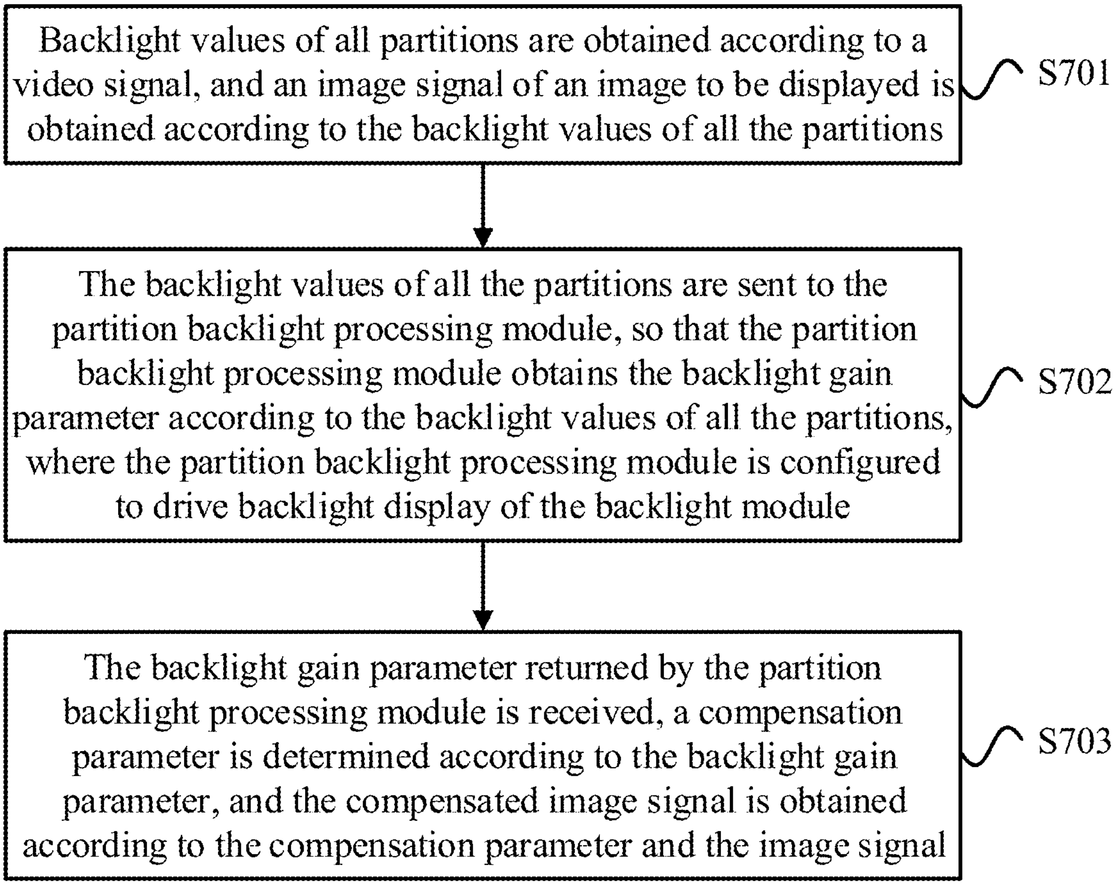
FIG. 7 is a first schematic flowchart of an image processing method according to some embodiments of the disclosure.

FIG. 7 is a first schematic flowchart of an image processing method according to some embodiments of the disclosure. An execution body of the embodiment may be the processor in the embodiments shown in FIG. 6. As shown in FIG. 7, the method can include the following.

S701: backlight values of all partitions are obtained according to a video signal, and an image signal of an image to be displayed is obtained according to the backlight values of all the partitions.

In some embodiments of the disclosure, a backlight optical model storage unit can be pre-stored in the image processing module, and the backlight optical model storage unit may obtain the image signal of the image to be displayed according to the backlight values of all the partitions. The backlight values of all the partitions in the backlight module are obtained by counting image gray scale partitions of the received video signal. Pre-stored backlight optical models are light diffusion models, and an independent lighting function of each partition is implemented according to the backlight values corresponding to the partitions at different positions and the light diffusion models corresponding to the partitions at different positions, i.e., pixel brightness values of the image to be displayed corresponding to all the partitions are obtained.

After obtaining the image signals corresponding to all the partitions, a pixel brightness value of each pixel dot in the image to be displayed is improved by performing brightness compensation on the image signals corresponding to all the partitions.

In some embodiments of the disclosure, the backlight module contains a total of M*N partitions, and M and N are position information of all the partitions contained in the backlight module respectively. FIG. 8 is a schematic diagram of partition backlight values of a backlight module according to some embodiments of the disclosure. As shown in FIG. 8, the backlight module according to some embodiments of the disclosure contains 6 rows and 8 columns of partitions, and a serial number of each partition may be determined according to a row number and a column number of each partition. For example, the partition in row 3 and column 4 corresponds to a serial number 20. A backlight value corresponding to the partition with the serial number 20 is determined to be 128 according to the obtained backlight values of all the partitions in the backlight module.

S702: the backlight values of all the partitions are sent to the partition backlight processing module, so that the partition backlight processing module obtains the backlight gain parameter according to the backlight values of all the partitions, where the partition backlight processing module is configured to drive backlight display of the backlight module.

In some embodiments of the disclosure, the partition backlight processing module is a functional module in the backlight drive unit, which implements compensation of the backlight values of all the partitions. The backlight drive unit is provided by a microprocessor, and the partition backlight processing module is configured to determine a duty cycle of the PWM drive module corresponding to each partition according to the backlight values of all the partitions, so that the PWM drive module in the backlight drive unit controls the display brightness of the light emitting diode corresponding to each partition in the backlight module, and controls the display brightness of the backlight module.

Figure 9:
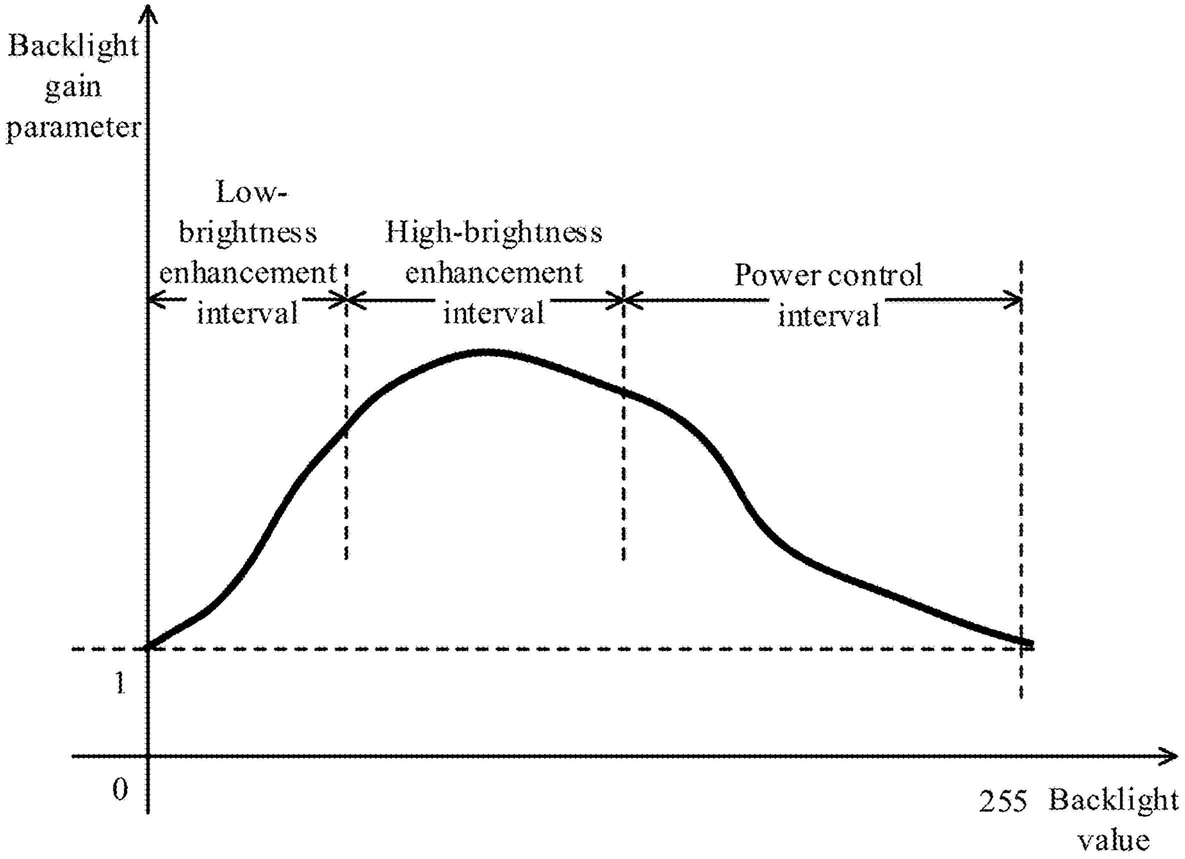
FIG. 9 is a schematic diagram of a peak backlight gain curve according to some embodiments of the disclosure.

Specifically, the partition backlight processing module obtains an average backlight value of all the partitions according to the backlight values of all the partitions, and obtains the backlight gain parameter according to the obtained average backlight value. Specifically, peak brightness compensation is performed according to the average backlight value of all the partitions, i.e., the backlight gain parameter corresponding to the average backlight value is determined according to a peak backlight gain curve. As shown in FIG. 9, FIG. 9 is a schematic diagram of a peak backlight gain curve according to some embodiments of the disclosure. Herein, a horizontal coordinate indicates the average backlight value, and a vertical coordinate indicates the backlight gain parameter. The average backlight value of all the partitions in FIG. 8 is 128, and then the backlight gain parameter corresponding to the average backlight value of 128 may be determined according to the peak backlight gain curve of FIG. 9.

S703: the backlight gain parameter returned by the partition backlight processing module is received, a compensation parameter is determined according to the backlight gain parameter, and the compensated image signal is obtained according to the compensation parameter and the image signal.

In some embodiments of the disclosure, the compensation parameter corresponding to the backlight gain parameter may be determined according to a preset mapping table. For example, a mapping relationship between the backlight gain parameters and the compensation parameters is given in the preset mapping table. The compensation parameter is a color compensation parameter. Specifically, the preset mapping table may be initially set according to experience to provide a correspondence between the backlight gain parameter and the compensation parameter. After the compensation parameter is determined according to the backlight gain parameter, the compensated image signal is obtained according to the compensation parameter and the image signal. Then the timing control signal is generated according to the compensated image signal, so that the timing controller drives image display of the liquid crystal panel according to the timing control signal; and a tester determines adjustment parameters according to the displayed image. The preset mapping table is adjusted according to the adjustment parameters, so that the mapping relationship between the backlight gain parameter and the compensation parameter in the preset mapping table is more in line with the display requirements of the image.

Figure 10:
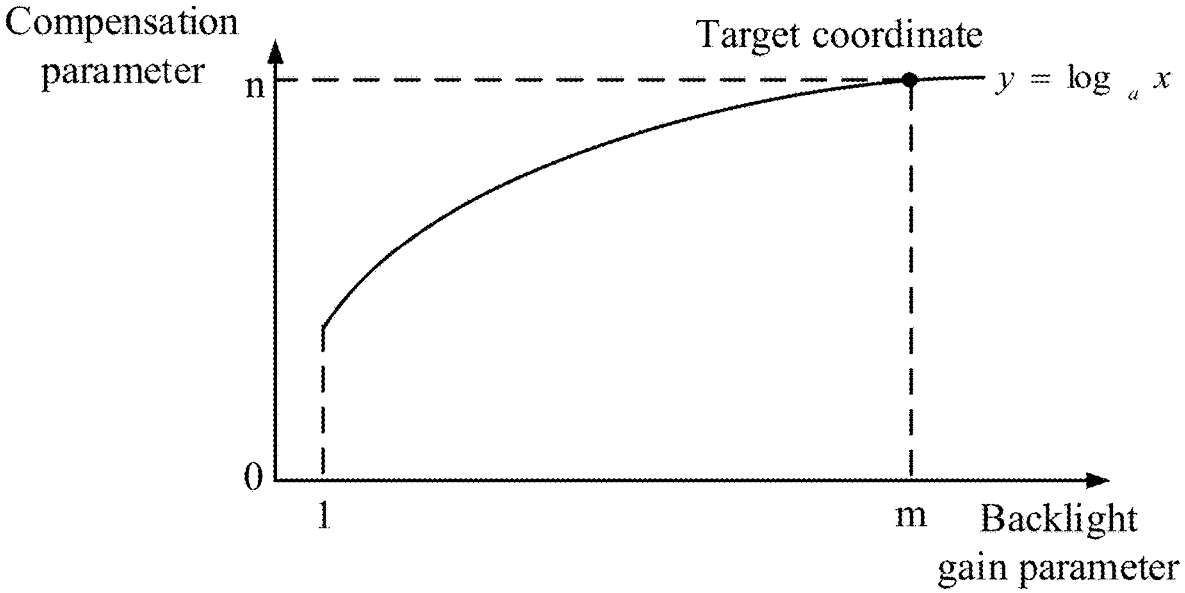
FIG. 10 is a schematic diagram of a peak brightness compensation curve according to some embodiments of the disclosure.

In some embodiments of the disclosure, the compensation parameter corresponding to the backlight gain parameter may further be determined according to a peak brightness compensation curve. FIG. 10 is a schematic diagram of a peak brightness compensation curve according to some embodiments of the disclosure. In some embodiments of the disclosure, the display apparatus is debugged by using a chromaticity debugging device to obtain a standard chromaticity value of the display apparatus. For example, the chromaticity debugging device is CA-310 or CA-410. After the standard chromaticity value is determined, the standard chromaticity value is taken as a target chromaticity value; and after obtaining the backlight gain parameter according to the backlight values of all the partitions, the compensation parameter is adjusted when the backlight gain parameter is set to a maximum value so as to cause the current display chromaticity to reach the target chromaticity value, the corresponding compensation parameter in this case is determined to be a compensation parameter threshold, and the maximum value of the backlight gain parameter is taken as a backlight gain parameter threshold.

After the backlight gain parameter threshold and the compensation parameter threshold are determined, a target parameter is determined according to the backlight gain parameter threshold and the compensation parameter threshold, and the peak brightness compensation curve is generated according to the target parameter. Specifically, the backlight gain parameter threshold m is taken as a horizontal coordinate, the compensation parameter threshold n is taken as a vertical coordinate, and a target coordinate (m, n) corresponding to the target parameter is determined according to the backlight gain parameter threshold and the compensation parameter threshold; and a base a of a corresponding logarithmic function curve is determined according to the target coordinate, and the logarithmic function curve is taken as the peak brightness compensation curve.

An expression for a first curve is shown in an equation (1):

$$y=\log_a x \quad (1)$$

where x is greater than or equal to 1, and y is greater than or equal to 1.

In some embodiments of the disclosure, after the compensation parameter corresponding to the backlight gain parameter is determined according to the peak brightness compensation curve, the compensated image signal is obtained according to the compensation parameter and the image signal. Then the timing control signal is generated according to the compensated image signal, so that the timing controller drives image display of the liquid crystal panel according to the timing control signal; and the tester determines the adjustment parameters according to the displayed image. The peak brightness compensation curve is adjusted according to the adjustment parameters, so that the corresponding relationship between the backlight gain parameter and the compensation parameter in the peak brightness compensation curve is more in line with the display requirements of the image.

In the image processing method according to the embodiments, the compensation parameter can be determined according to the backlight gain parameter returned by the partition backlight processing module, so that the compensated image signal can be obtained according to the compensation parameter and the signal of the image to be displayed, the chromaticity of the image is dynamically compensated, the color brightness of the image to be displayed is optimized, and the display effect of the image can be improved.

Figure 11:
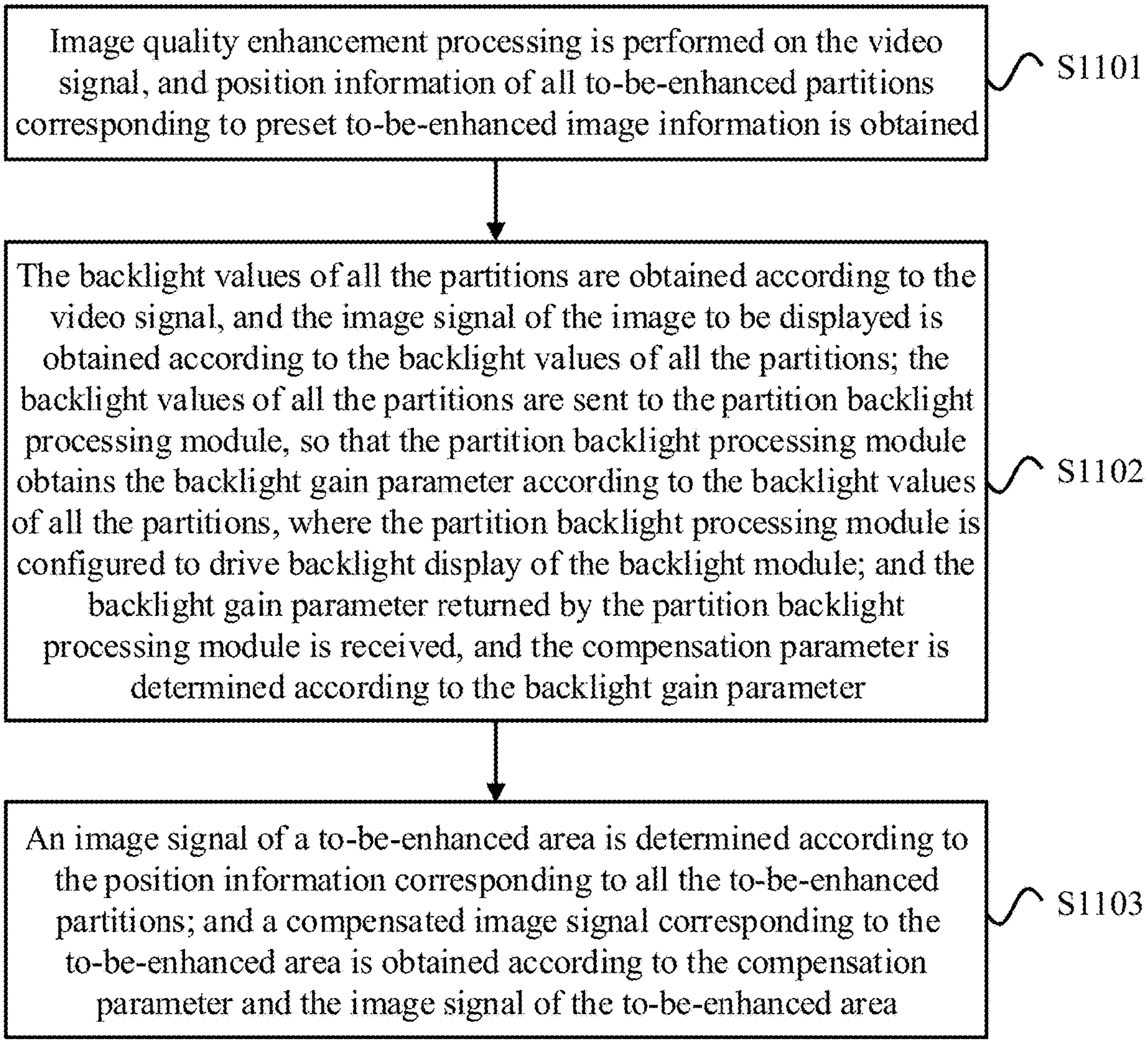
FIG. 11 is a second schematic flowchart of an image processing method according to some embodiments of the disclosure.

FIG. 11 is a second schematic flowchart of an image processing method according to some embodiments of the disclosure. As shown in FIG. 11, the image processing method according to some embodiments of the disclosure can include the following.

S1101: image quality enhancement processing is performed on the video signal, and position information of all to-be-enhanced partitions corresponding to preset to-be-enhanced image information is obtained.

In some embodiments of the disclosure, image processing is performed on the video signal to obtain the image to be displayed, and image quality enhancement processing is performed on the image to be displayed. Specifically, image quality enhancement processing is to purposefully emphasize overall or local characteristics of the image, make the original unclear image become clear or emphasize some of features of interest, expand differences between features of different objects in the image, and suppress features of disinterest, so as to improve image quality and enrich the amount of information and enhance image interpretation and identification effects, thereby meeting needs of some special analyses. In some embodiments of the disclosure, image quality enhancement processing is performed on the image to be displayed, precisely acting on colors in the image that need to be enhanced, for example, identifying positions of the partitions corresponding to the to-be enhanced colors of blue sky, a green tree, and skin of a close-up human face displayed in the image to be displayed.

S1102: the backlight values of all the partitions are obtained according to the video signal, and the image signal of the image to be displayed is obtained according to the backlight values of all the partitions; the backlight values of all the partitions are sent to the partition backlight processing module, so that the partition backlight processing module obtains the backlight gain parameter according to the backlight values of all the partitions, where the partition backlight processing module is configured to drive backlight display of the backlight module; and the backlight gain parameter returned by the partition backlight processing module is received, and the compensation parameter is determined according to the backlight gain parameter.

The method and effect of this step is consistent with the methods and effects of S701 to S703 in the embodiments of FIG. 7, and will not be repeated here.

S1103: an image signal of a to-be-enhanced area is determined according to the position information corresponding to all the to-be-enhanced partitions; and a compensated image signal corresponding to the to-be-enhanced area is obtained according to the compensation parameter and the image signal of the to-be-enhanced area.

In some embodiments of the disclosure, after position information corresponding to all to-be-enhanced partitions that require color compensation is obtained, the image signal of the to-be-enhanced area is determined according to the position information corresponding to all the to-be-enhanced partitions; and the image signal after color compensation corresponding to the to-be-enhanced area is determined according to the compensation parameter and the image signal of the to-be-enhanced area.

Before the image signal after compensation is determined, the number of all the to-be-enhanced partitions may be determined according to the position information corresponding to all the to-be-enhanced partitions, and a proportion coefficient is determined according to the number of all the to-be-enhanced partitions and the number of all the partitions; the compensated image signal corresponding to the to-be-enhanced area is obtained according to the compensation parameter and the image signal of the to-be-enhanced area if the proportion coefficient is greater than or equal to a preset percentage; and otherwise, the compensated image signal is obtained according to the compensation parameter and the image signal. Specifically, if the proportion coefficient determined according to the number of all the to-be-enhanced partitions and the number of all the partitions is greater than or equal to the preset percentage, it means that the image displayed on the to-be-enhanced partitions is the more important image in the image to be displayed. Otherwise, if the proportion coefficient is less than the preset percentage, it means that the image displayed on the to-be-enhanced partitions accounts for a relatively small proportion of the image to be displayed. Therefore, color compensation may be targeted to the more important image in the image to be displayed to improve the efficiency and effect of color compensation. For example, the preset percentage is 30%.

In the image processing method according to the embodiments, the image signal of the to-be-enhanced area is obtained by adopting an image quality enhancement processing algorithm, the compensated image signal corresponding to the to-be-enhanced area is determined according to the compensation parameter and the image signal of the to-be-enhanced area, compensation is targeted to the color of the to-be-enhanced area, an effect of local image enhancement is realized, the color brightness of the image to be displayed is optimized, and the display effect of the image is improved.

Figure 12:
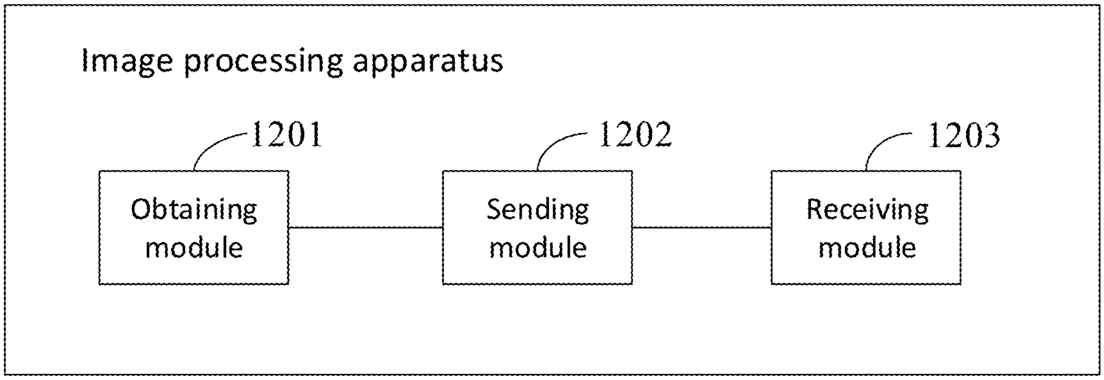
FIG. 12 is a schematic structural diagram of an image processing apparatus according to some embodiments of the disclosure.

FIG. 12 is a schematic structural diagram of an image processing apparatus according to some embodiments of the disclosure. As shown in FIG. 12, the image processing apparatus can include an obtaining module 1201, a sending module 1202, and a receiving module 1203. The obtaining module 1201 is configured to obtain backlight values of all partitions according to a video signal, and obtain an image signal of an image to be displayed according to the backlight values of all the partitions. The sending module 1202 is configured to send the backlight values of all the partitions to a partition backlight processing module, so that the partition backlight processing module obtains a backlight gain parameter according to the backlight values of all the partitions, where the partition backlight processing module is configured to drive backlight display of a backlight module. The receiving module 1203 is configured to receive the backlight gain parameter returned by the partition backlight processing module, determine a compensation parameter according to the backlight gain parameter, and obtain a compensated image signal according to the compensation parameter and the image signal.

In some embodiments, the receiving module 1203 can be specifically configured to: determine the compensation parameter corresponding to the backlight gain parameter according to a preset mapping table; or, determine the compensation parameter corresponding to the backlight gain parameter according to a peak brightness compensation curve.

In some embodiments, the image processing apparatus can further include a determining module configured to: determine a maximum value of the backlight gain parameter as a backlight gain parameter threshold, and determine a compensation parameter threshold for the backlight gain parameter threshold according to a target chromaticity value, where the target chromaticity value is a standard chromaticity value of a display apparatus; and determine a target parameter according to the backlight gain parameter threshold and the compensation parameter threshold, and generate the peak brightness compensation curve according to the target parameter, where the peak brightness compensation curve is a logarithmic function curve, and the target parameter is a base of the peak brightness compensation curve.

In some embodiments, the image processing apparatus according to some embodiments of the disclosure can further include an adjusting module configured to: generate a timing control signal according to the compensated image signal, so that a timing controller drives image display of a liquid crystal panel according to the timing control signal; and determine an adjustment parameter according to the image displayed in the liquid crystal panel, and adjust the preset mapping table or the peak brightness compensation curve according to the adjustment parameter.

In some embodiments, the image processing apparatus according to some embodiments of the disclosure can further include a processing module configured to: perform image quality enhancement processing on the video signal, and obtain position information of all to-be-enhanced partitions corresponding to preset to-be-enhanced image information.

In some embodiments, the image processing apparatus according to some embodiment(s) of the disclosure can further include a determining module configured to: determine the image signal of the to-be-enhanced area according to the position information corresponding to all the to-be-enhanced partitions; and obtain the compensated image signal corresponding to the to-be-enhanced area according to the compensation parameter and the image signal of the to-be-enhanced area.

For ease of explanation, the above description has been made in conjunction with specific embodiments. However, the above exemplary discussion is not intended to be exhaustive or to limit the embodiments to specific forms disclosed above. Various modifications and deformations may be obtained according to the above teaching. The above embodiments are selected and described to better explain principles and practical applications, thereby enabling those skilled in the art to better use the embodiments as well as various different variations of the embodiments suitable for specific use considerations.

What is claimed is:

1. A display apparatus, comprising:

at least one processor, configured to execute instructions to cause the display apparatus to:

obtain backlight values of all partitions according to a video signal, and obtain an image signal of an image to be displayed according to the backlight values of all the partitions;

send the backlight values of all the partitions to a partition backlight processing module, so that the partition backlight processing module obtains a backlight gain parameter according to the backlight values of all the partitions, wherein the partition backlight processing module is configured to drive backlight display of a backlight module; and receive the backlight gain parameter returned by the partition backlight processing module, determine a compensation parameter according to the backlight gain parameter, and obtain a compensated image signal according to the compensation parameter and the image signal; and a display in connection with the at least one processor, configured to display a compensated image, wherein the at least one processor is further configured to execute instructions to cause the display apparatus to: determine the compensation parameter corresponding to the backlight gain parameter according to a peak brightness compensation curve.

2. The display apparatus according to claim 1, wherein the at least one processor is further configured to execute instructions to cause the display apparatus to:

determine a maximum value of the backlight gain parameter as a backlight gain parameter threshold, and determine a compensation parameter threshold for the backlight gain parameter threshold according to a target chromaticity value, wherein the target chromaticity value is a standard chromaticity value of the display apparatus; and determine a target parameter according to the backlight gain parameter threshold and the compensation parameter threshold, and generate the peak brightness compensation curve according to the target parameter, wherein the peak brightness compensation curve is a logarithmic function curve, and the target parameter is a base of the peak brightness compensation curve.

3. The display apparatus according to claim 2, wherein the at least one processor is further configured to execute instructions to cause the display apparatus to:

generate a timing control signal according to the compensated image signal, so that a timing controller drives image display of a liquid crystal panel according to the timing control signal; and determine an adjustment parameter according to the image displayed in the liquid crystal panel, and adjust the peak brightness compensation curve according to the adjustment parameter.

4. The display apparatus according to claim 1, wherein the at least one processor is further configured to execute instructions to cause the display apparatus to:

perform image quality enhancement processing on the video signal to obtain position information of all to-be-enhanced partitions corresponding to preset to-be-enhanced image information.

5. The display apparatus according to claim 4, wherein the at least one processor is further configured to execute instructions to cause the display apparatus to:

after determining the compensation parameter according to the backlight gain parameter, determine an image signal of a to-be-enhanced area according to the position information corresponding to all the to-be-enhanced partitions; and obtain the compensated image signal corresponding to the to-be-enhanced area according to the compensation parameter and the image signal of the to-be-enhanced area.

6. The display apparatus according to claim 5, wherein the at least one processor is further configured to execute instructions to cause the display apparatus to:

determine a quantity of all the to-be-enhanced partitions according to the position information corresponding to all the to-be-enhanced partitions, and determine a proportion coefficient according to the quantity of all the to-be-enhanced partitions and a quantity of all partitions.

7. The display apparatus according to claim 6, wherein the at least one processor is further configured to execute instructions to cause the display apparatus to:

based on that the proportion coefficient is greater than or equal to a preset percentage, obtain the compensated image signal corresponding to the to-be-enhanced area according to the compensation parameter and the image signal of the to-be-enhanced area; and based on that the proportion coefficient is less than the preset percentage, obtain the compensated image signal according to the compensation parameter and the image signal.

8. The display apparatus according to claim 1, wherein the compensation parameter is a chromaticity compensation parameter.

9. An image processing method for a display apparatus, comprising:

obtaining backlight values of all partitions according to a video signal, and obtaining an image signal of an image to be displayed according to the backlight values of all the partitions;

sending the backlight values of all the partitions to a partition backlight processing module, so that the partition backlight processing module obtains a backlight gain parameter according to the backlight values of all the partitions, wherein the partition backlight processing module is configured to drive backlight display of a backlight module; and receiving the backlight gain parameter returned by the partition backlight processing module, determining a compensation parameter according to the backlight gain parameter, and obtaining a compensated image signal according to the compensation parameter and the image signal, wherein the image processing method further comprises: determining the compensation parameter corresponding to the backlight gain parameter according to a peak brightness compensation curve.

10. The image processing method according to claim 9, wherein before determining the compensation parameter corresponding to the backlight gain parameter according to the peak brightness compensation curve, the method further comprises:

determining a maximum value of the backlight gain parameter as a backlight gain parameter threshold, and determining a compensation parameter threshold for the backlight gain parameter threshold according to a target chromaticity value, wherein the target chromaticity value is a standard chromaticity value of the display apparatus; and determining a target parameter according to the backlight gain parameter threshold and the compensation parameter threshold, and generating the peak brightness compensation curve according to the target parameter, wherein the peak brightness compensation curve is a logarithmic function curve, and the target parameter is a base of the peak brightness compensation curve.

11. The image processing method according to claim 10, wherein after obtaining the compensated image signal according to the compensation parameter and the image signal, the method further comprises:

generating a timing control signal according to the compensated image signal, so that a timing controller drives image display of a liquid crystal panel according to the timing control signal; and determining an adjustment parameter according to the image displayed in the liquid crystal panel, and adjusting the peak brightness compensation curve according to the adjustment parameter.

12. The image processing method according to claim 9, wherein before obtaining the backlight values of all the partitions according to the video signal, the method further comprises:

performing image quality enhancement processing on the video signal to obtain position information of all to-be-enhanced partitions corresponding to preset to-be-enhanced image information.

13. The image processing method according to claim 12, wherein after determining the compensation parameter according to the backlight gain parameter, the method further comprises:

determining an image signal of a to-be-enhanced area according to the position information corresponding to all the to-be-enhanced partitions; and obtaining the compensated image signal corresponding to the to-be-enhanced area according to the compensation parameter and the image signal of the to-be-enhanced area.

14. The image processing method according to claim 13, wherein before determining the image signal of all the to-be-enhanced partitions according to the compensation parameter and the position information of all the to-be-enhanced partitions, the method further comprises:

determining a quantity of all the to-be-enhanced partitions according to the position information corresponding to all the to-be-enhanced partitions, and determining a proportion coefficient according to the quantity of all the to-be-enhanced partitions and a quantity of all partitions.

15. The image processing method according to claim 14, further comprising:

based on that the proportion coefficient is greater than or equal to a preset percentage, obtaining the compensated image signal corresponding to the to-be-enhanced area according to the compensation parameter and the image signal of the to-be-enhanced area; and based on that the proportion coefficient is less than the preset percentage, obtaining the compensated image signal according to the compensation parameter and the image signal.

16. The image processing method according to claim 9, wherein the compensation parameter is a chromaticity compensation parameter.

* * * * *